(12) United States Patent
Rasmussen

(10) Patent No.: US 12,727,582 B2
(45) Date of Patent: Sep. 8, 2026

(54) ELECTRONICALLY CONTROLLED DOG LEASH WITH TENSION ADJUSTMENT

(71) Applicant: Aaron Rasmussen, Camas, WA (US)

(72) Inventor: Aaron Rasmussen, Camas, WA (US)

( * ) Notice: Subject to any disclaimer, the term of this patent is extended or adjusted under 35 U.S.C. 154(b) by 0 days.

(21) Appl. No.: 19/199,776

(22) Filed: May 6, 2025

(65) Prior Publication Data

US 2025/0338829 A1 Nov. 6, 2025

Related U.S. Application Data

(60) Provisional application No. 63/642,902, filed on May 6, 2024.

(51) Int. Cl.
*A01K 27/00* (2006.01)
*B65H 75/44* (2006.01)

(52) U.S. Cl.
CPC ....... *A01K 27/004* (2013.01); *B65H 75/4484* (2013.01); *B65H 75/4486* (2013.01); *B65H 2402/411* (2013.01); *B65H 2553/51* (2013.01)

(58) Field of Classification Search
CPC .................................................... A01K 27/004
See application file for complete search history.

(56) References Cited

U.S. PATENT DOCUMENTS 2,314,504 A * 3/1943 Lifchultz ............. A01K 27/004 242/379.2
3,123,052 A 3/1964 Marshall
6,694,922 B2 2/2004 Walter et al.
7,036,459 B1 * 5/2006 Mugford .............. A01K 27/004 242/405
9,339,014 B1 * 5/2016 Wettermann ......... A01K 27/004
12,127,533 B1 * 10/2024 Galasso ............... A01K 27/004
12,484,554 B1 * 12/2025 Messimer ............ A01K 27/004
2007/0131177 A1 * 6/2007 Perkitny .............. A01K 27/004 119/796
2017/0021798 A1 * 1/2017 Sanchez Huipio .... A01K 15/04
2021/0331038 A1 * 10/2021 Hendricks .......... A63B 21/0058
2021/0368741 A1 * 12/2021 Duffin .................. A01K 27/004
2022/0030826 A1 * 2/2022 Wilson ..................... A01K 3/00
2022/0079119 A1 * 3/2022 Saukko .............. B65H 75/4431
2022/0179146 A1 * 6/2022 Eräluoto .............. A01K 27/004
2022/0201981 A1 * 6/2022 Synytsya ............ A01K 27/004
2023/0172166 A1 * 6/2023 Delgado .............. A01K 27/002 119/792
2024/0359945 A1 * 10/2024 Solar .................... B65H 75/364
2025/0302006 A1 * 10/2025 Fukami ................ A01K 27/003

* cited by examiner

*Primary Examiner* — William L Gmoser

(57) ABSTRACT

An electronically controlled dog leash with adjustable tension includes an electric motor connected to a leash reel, a motor controller, a microprocessor, at least one sensor for monitoring leash position, and a power source. The microprocessor processes sensor data and controls the motor to maintain minimal tension while accommodating changes in distance between dog and owner. An adjustable slow-down feature gradually increases tension over a user-defined distance as the leash approaches maximum extension, preventing sudden jerks. A manual stop/lock mechanism may be included to prevent leash extension when needed. User-adjustable controls allow customization of tension, retraction speed, and slow-down parameters. The leash improves comfort and safety while facilitating loose leash training.

16 Claims, 4 Drawing Sheets

ELECTRONICALLY CONTROLLED DOG LEASH WITH TENSION ADJUSTMENT

CROSS-REFERENCE TO RELATED APPLICATIONS

This application claims the benefit of U.S. Provisional Patent Application No. 63/642,902, filed May 6, 2024, which is hereby incorporated by reference in its entirety.

BACKGROUND OF THE INVENTION

Traditional dog leashes, including spring-based retractable models, typically apply increasing tension as the distance between the dog and the owner increases. This constant and often increasing tension presents several problems in practice. First, it can interfere with loose leash training methods, which aim to teach dogs to walk without pulling. Second, the constant tension can cause discomfort for both the dog and the owner during walks. Third, excess leash can become tangled around the legs of either the dog or the owner, creating potential safety hazards.

Conventional retractable leashes utilize mechanical springs to provide tension, which limits customization options and fails to adapt to the dynamic nature of dog walking. While some advanced leashes offer locking mechanisms, they still lack the ability to intelligently manage leash tension based on the movement patterns of the dog and owner.

Some existing leash designs incorporate motorized mechanisms for retracting or extending a leash. However, these devices typically require constant manual control through triggers or buttons and do not provide automated tension management based on the dog's movements. Other designs feature automatic rewinding capabilities based on mechanical springs, but these lack electronic controls for customizing tension settings.

There exists a need for an improved dog leash system that can minimize unnecessary tension while still providing control, adapt to changing walking conditions, and enhance safety and comfort for both dogs and their owners. A system that could electronically monitor and adjust leash tension in real-time based on the dog's movements would represent a significant advancement over existing technology.

SUMMARY OF THE INVENTION

The present invention addresses the limitations of conventional dog leashes by providing an electronically controlled dog leash system that intelligently manages leash tension.

In one aspect, the invention provides an electronically controlled dog leash comprising an electric motor connected to a leash reel, a motor controller, a microprocessor, at least one sensor for monitoring leash position and tension, a power source, and a charging circuit. The microprocessor processes sensor data in real-time and controls the motor to maintain optimal slack in the leash while accommodating changes in distance between the dog and owner.

In another aspect, the invention includes an adjustable slow-down feature that gradually increases tension over a user-defined distance at the end of the leash's extension range. This feature allows for a smooth deceleration of the dog's movement rather than an abrupt stop, preventing sudden jerks that could cause discomfort or injury.

In yet another aspect, the invention may include a manual stop/lock mechanism that can be activated by the user to prevent the leash from extending further. This feature provides additional control in situations where the user needs to keep the dog close or prevent the leash from unwinding.

The invention offers several advantages over conventional leashes, including customizable tension settings, intelligent adaptation to movement patterns, enhanced safety through controlled deceleration, and improved comfort for both dogs and owners. Additionally, the electronic control system facilitates loose leash training by minimizing unnecessary tension during walks.

DETAILED DESCRIPTION OF THE INVENTION

A The present invention will now be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Various modifications and variations can be made to the embodiments of the invention described herein. It is to be understood that other embodiments may be utilized, and that structural, logical, and electrical changes may be made without departing from the scope of the present invention.

Figure 1:
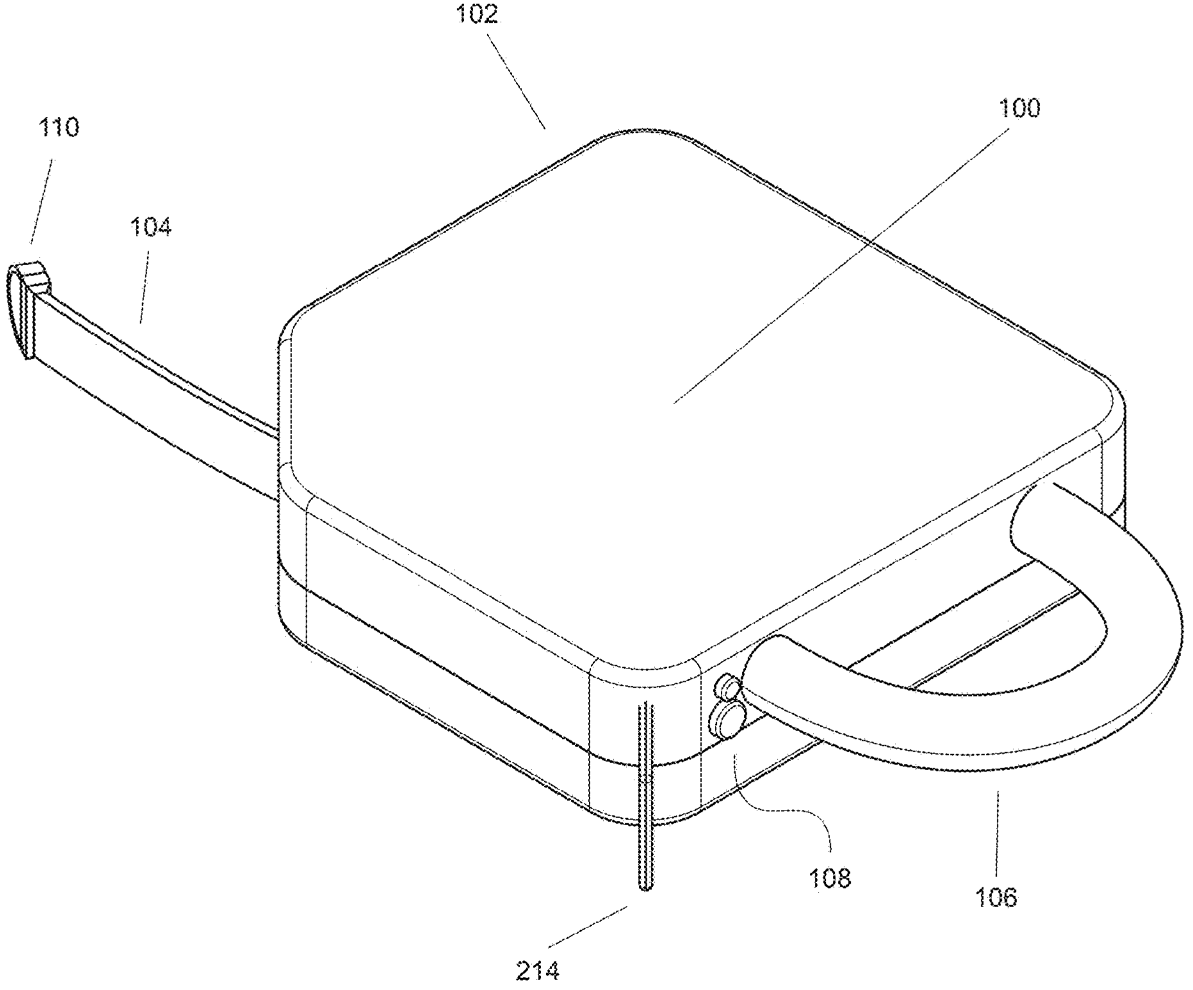
FIG. 1 is a perspective view of an electronically controlled dog leash according to an embodiment of the present invention.

Referring to FIG. 1, an electronically controlled dog leash 100 according to an embodiment of the present invention is shown. The leash 100 includes a housing 102 that contains the electronic components, a leash cord or strap 104 that extends from and retracts into the housing 102, a handle 106 for gripping by the user, a control panel 108 with user interface elements, and a connector 110 for attaching to a dog collar or harness.

Figure 2:
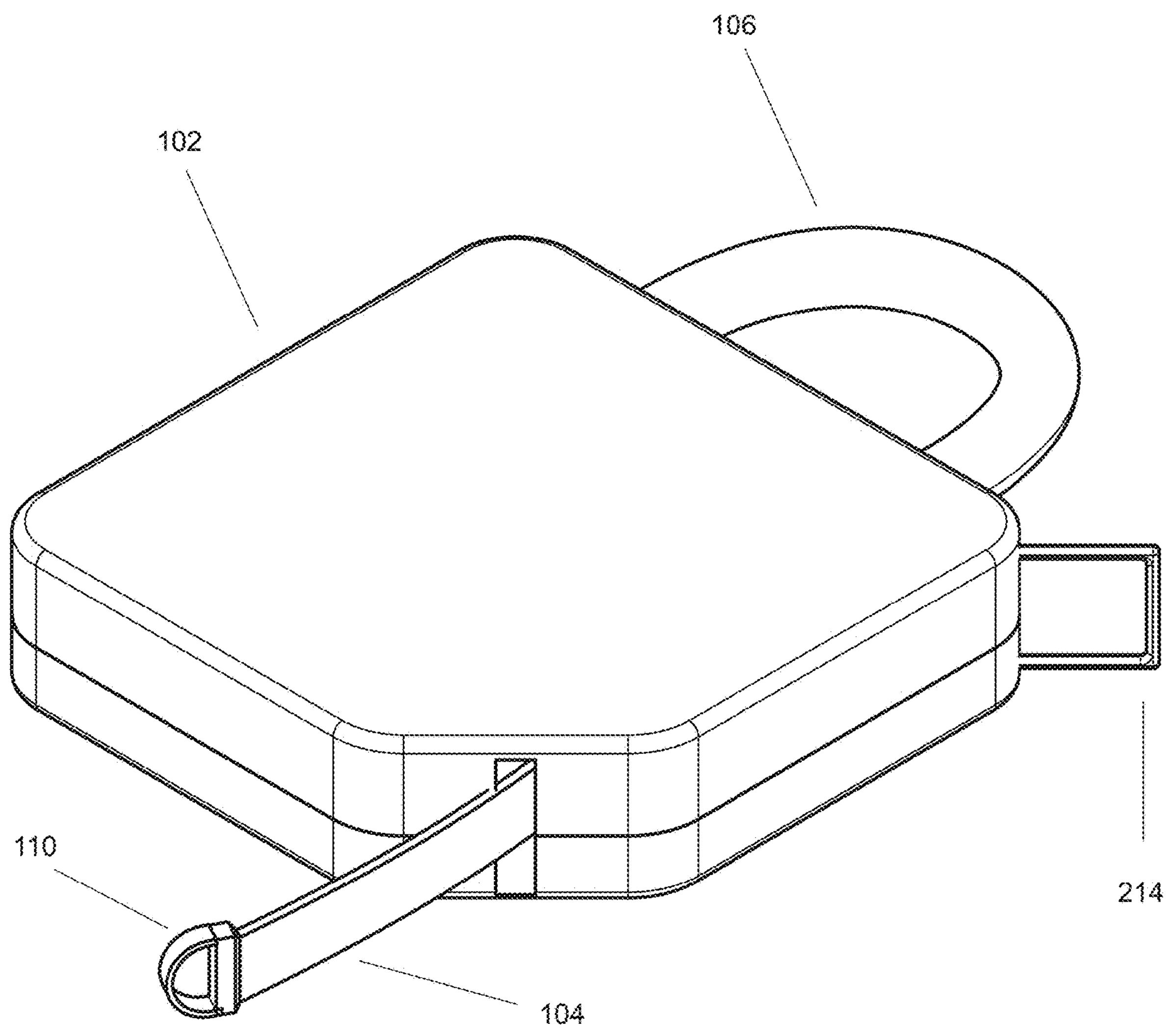
FIG. 2 is a second perspective view of the electronically controlled dog leash of FIG. 1, showing the device from a different angle.

FIG. 2 provides another perspective view of the leash 100, showing the housing 102, handle 106, and control panel 108 from a different angle to better illustrate the ergonomic design and user interface elements of the device.

Figure 3:
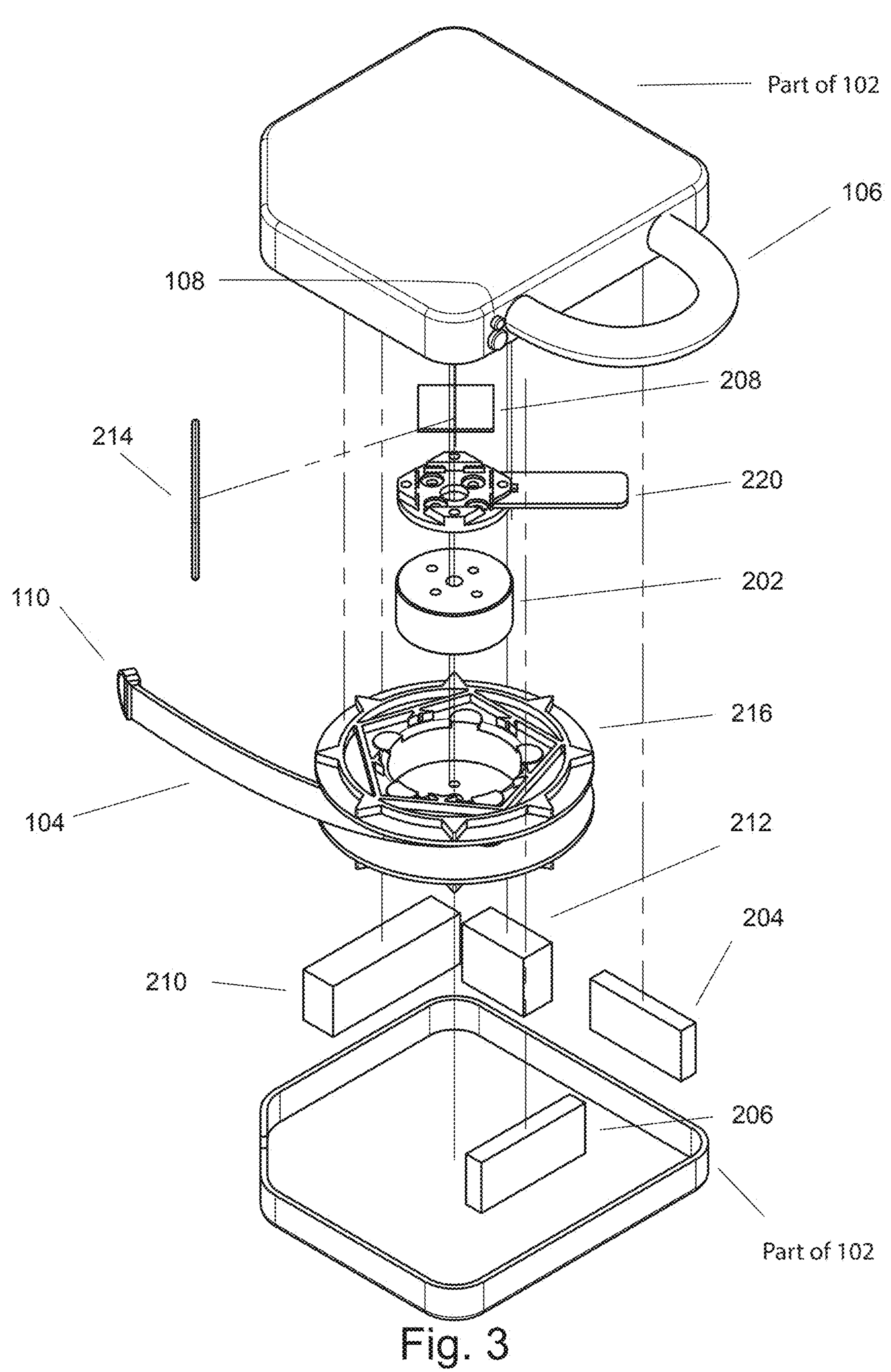
FIG. 3 is an exploded view showing the internal components of the electronically controlled dog leash according to an embodiment of the present invention.
Figure 4:
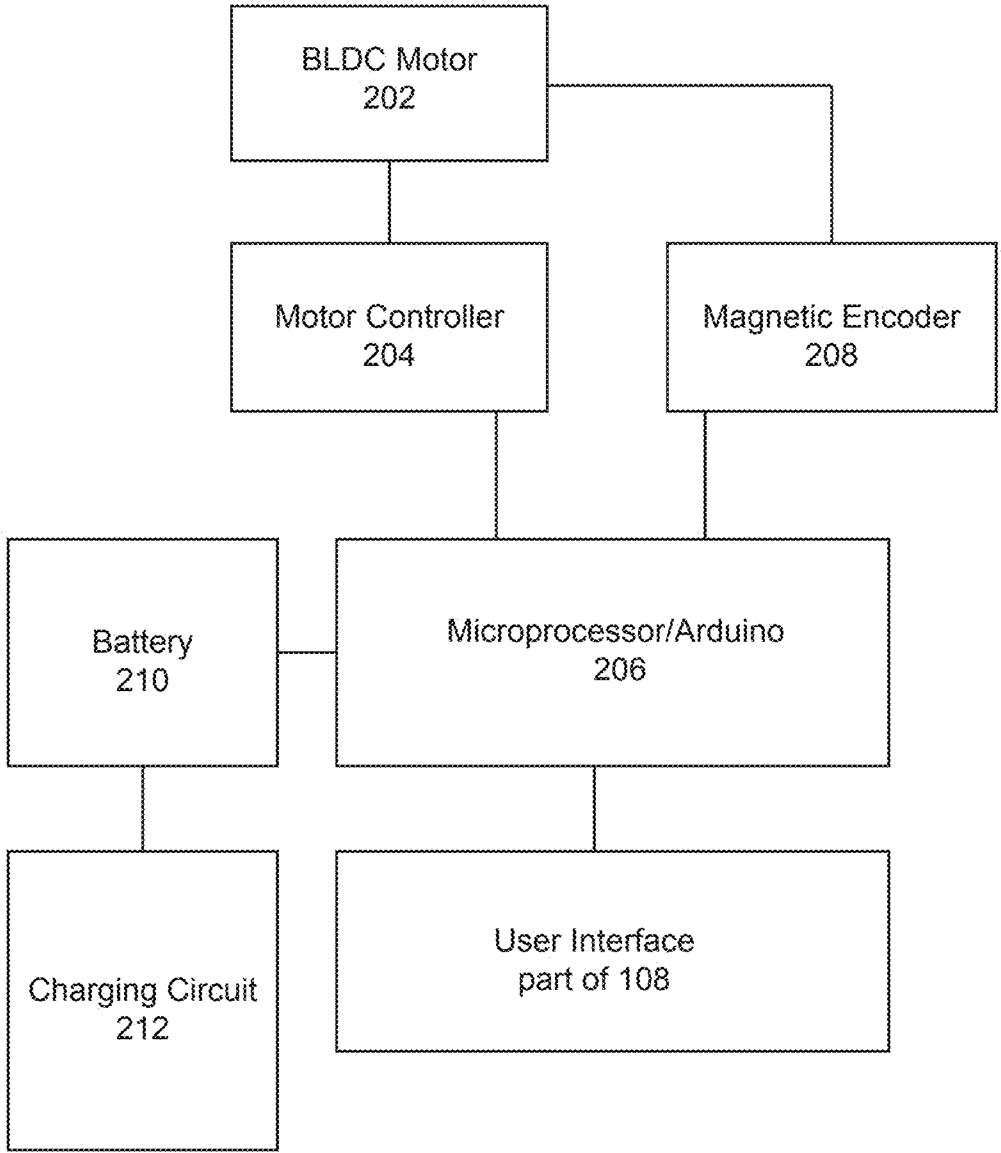
FIG. 4 is a block diagram illustrating the electronic components and their connections within the leash system.

FIG. 3 illustrates an exploded view of the leash 100, showing the internal components housed within the housing 102. These components include a brushless DC motor (BLDC) 202, a motor controller 204, a microprocessor 206, a magnetic encoder 208, a battery 210, a charging circuit 212, a manual stop/lock mechanism 214 when included in the embodiment, a leash reel assembly 216, a pushbutton for the manual stop/lock mechanism, and a motor and encoder mount 220.

The BLDC motor 202 is mechanically connected to the leash reel 216 for retracting and extending the leash cord 104. The motor controller 204 is electrically connected to the BLDC motor 202 and regulates the operation of the motor based on signals received from the microprocessor 206. The microprocessor 206, which may be implemented using an Arduino or similar platform, processes data from the magnetic encoder 208 and executes the control algorithms that determine the motor's behavior.

The magnetic encoder 208, such as an AS5600 or equivalent, is mounted on the leash reel 216 and provides precise position and angle data to the microprocessor 206. This data allows the system to track the extension and retraction of the leash with high accuracy.

The microprocessor 206, motor controller 204, BLDC motor 202, and magnetic encoder 208 are secured within the housing 102 by a motor and encoder mount 220. The motor and encoder mount 220 is configured to properly position and align these components relative to each other and to the leash reel assembly 216, ensuring proper mechanical and electrical connections while minimizing vibration during operation.

The battery 210 provides power to all electronic components of the system, while the charging circuit 212 allows the battery to be recharged using a standard charging cable connected to an external power source.

When included, the manual stop/lock mechanism 214 is mechanically coupled to the leash reel 216 and can be activated by the pushbutton 218 on the housing 102. When engaged, this mechanism prevents the leash from extending further, providing an additional level of control.

In operation, the electronically controlled dog leash 100 maintains minimal tension on the leash cord 104 during normal use, providing a comfortable experience for both the dog and the owner. The magnetic encoder 208 continuously monitors the position and angle of the leash reel 216, allowing the microprocessor 206 to detect changes in the relative position of the dog and owner.

When the dog moves away from the owner, the system detects the increasing angle and signals the motor controller 204 to allow the BLDC motor 202 to pay out additional leash cord 104 with minimal resistance. Conversely, when the dog moves toward the owner, creating slack in the leash, the system detects the decreasing angle and signals the motor to gently retract the excess cord, preventing tangling.

The adjustable slow-down feature allows users to customize how the leash behaves as it approaches its maximum extension. Users can set both the distance at which the slow-down begins and the rate at which tension increases. This customization allows the leash to be tailored to dogs of different sizes, weights, and training levels. For example, a larger, stronger dog might benefit from a longer slow-down distance with a more gradual increase in tension, while a smaller dog might require a shorter distance with less overall tension.

Users can adjust various parameters through the control panel 108, including baseline tension, retraction speed, slow-down distance, and slow-down tension. These settings can be saved as presets for different dogs or walking conditions.

The housing 102 includes a clip or attachment point (not shown in figures) for securing the leash to the owner's belt, waist, or backpack, enabling hands-free operation. This feature is particularly useful for activities such as jogging, hiking, or when the owner needs free hands for other tasks.

The optional manual stop/lock mechanism 214, when included and activated via the pushbutton 218, engages with the leash reel 216 to prevent further extension of the leash cord 104. This feature is useful in situations where the owner needs to keep the dog close, such as when crossing busy streets or navigating crowded areas.

Alternative embodiments of the invention may include various modifications to the components described above. For example, a brushed DC motor could be used instead of a BLDC motor for cost-effectiveness in certain models. Different types of sensors, such as current sensors, strain gauges, or load cells, could be employed for monitoring leash tension. Various microcontrollers or embedded systems could serve as the microprocessor, depending on computational requirements and cost considerations.

Additional features that could be incorporated in alternative embodiments include LED lights for improved visibility during night walks, a wireless remote control for adjusting settings without accessing the main unit, or a smartphone app for enhanced functionality and customization. The smartphone integration could allow for tracking walking statistics, setting walking goals, or sharing routes with other dog owners.

The electronically controlled dog leash offers significant advantages over conventional leashes, including: customizable, low-tension operation that improves comfort for both dogs and owners; enhanced safety through controlled deceleration and tangle prevention; support for loose leash training through intelligent tension management; hands-free capability that allows owners to engage in other activities while walking their dogs; and adaptability to different dogs and walking conditions through user-adjustable settings.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electronically controlled dog leash, comprising: a housing; a leash extendable from and retractable into the housing; an electric motor connected to a reel mechanism for controlling the leash; at least one electronic sensor for generating data related to leash movement, the data including position data of the leash; a microprocessor for processing the sensor data and controlling the motor; and a power source; wherein the microprocessor is configured to automatically adjust motor operation based on the sensor data, and wherein the microprocessor is further configured to (i) determine, based on processing of the electronic sensor data, that the leash is approaching a maximum extension, and (ii) in response to said determination, electronically command the motor to gradually increase tension over a defined distance as the leash approaches the maximum extension.

2. The electronically controlled dog leash of claim 1, wherein the microprocessor is configured to maintain minimal tension on the leash during normal use and to adjust the tension based on changes in relative position between ends of the leash.

3. The electronically controlled dog leash of claim 1, further comprising a manual stop/lock mechanism activated by a pushbutton to prevent the leash from extending when engaged.

4. The electronically controlled dog leash of claim 1, wherein the electric motor is a brushless DC motor (BLDC).

5. The electronically controlled dog leash of claim 1, wherein the at least one sensor comprises a magnetic encoder mounted on the reel mechanism for monitoring position and angle of the leash.

6. The electronically controlled dog leash of claim 1, wherein the at least one sensor comprises a current sensor for monitoring motor current as an indicator of leash tension.

7. The electronically controlled dog leash of claim 1, wherein the at least one sensor comprises a strain gauge for directly measuring leash tension.

8. The electronically controlled dog leash of claim 1, further comprising user-adjustable controls configured to allow customization of operational parameters of the dog leash, including at least one of: tension, retraction speed, slow-down distance, and slow-down tension.

9. The electronically controlled dog leash of claim 1, further comprising a charging circuit for recharging the power source.

10. The electronically controlled dog leash of claim 1, further comprising an attachment point on the housing for securing the leash to a user's belt, waist, or backpack for hands-free operation.

11. The electronically controlled dog leash of claim 1, wherein the microprocessor monitors changes in the sensor data and adjusts retraction speed to prevent tangling of the leash.

12. A method of controlling a dog leash, comprising: monitoring electronic data from at least one electronic sensor associated with a motorized leash, the data including position data of the leash; analyzing the sensor data using a microprocessor; determining, by the microprocessor and based on said analyzing, that the leash is approaching a maximum extension; determining whether to adjust operation of an electric motor connected to the leash based on the analyzed sensor data; and automatically adjusting operation of the electric motor based on the determination, including, in response to determining that the leash is approaching the maximum extension, electronically commanding the electric motor to gradually increase tension over a defined distance.

13. The method of claim 12, further comprising providing user-adjustable controls for customizing operational parameters of the motorized leash.

14. A dog walking system, comprising: a collar or harness attachable to a dog; an electronic leash controller comprising: a housing with a retractable leash mechanism, an electric motor coupled to the retractable leash mechanism, at least one electronic sensor generating data related to leash conditions, the data including position data of the leash, and control circuitry configured to process the sensor data; and a user interface allowing customization of one or more leash operation parameters; wherein the control circuitry automatically adjusts operation of the electric motor based on the sensor data and the customized parameters, and wherein the control circuitry is further configured to (i) determine, based on processing of the electronic sensor data, that the leash is approaching a maximum extension, and (ii) in response to said determination, electronically command the electric motor to gradually increase tension over a defined distance.

15. The dog walking system of claim 14, wherein the user interface includes controls for adjusting at least one of: baseline tension, maximum tension, slow-down distance, and retraction speed.

16. The dog walking system of claim 14, wherein the collar or harness includes an attachment point for connecting to the retractable leash.

* * * * *